(12) United States Patent
Zitnik

(10) Patent No.: US 12,114,679 B2
(45) Date of Patent: Oct. 15, 2024

(54) PRE-RENDERING SYSTEM AND METHOD

(71) Applicant: James K. Zitnik, Southlake, TX (US)

(72) Inventor: James K. Zitnik, Southlake, TX (US)

(*) Notice: Subject to any disclaimer, the term of this patent is extended or adjusted under 35 U.S.C. 154(b) by 451 days.

(21) Appl. No.: 16/285,710

(22) Filed: Feb. 26, 2019

(65) Prior Publication Data

US 2019/0261649 A1   Aug. 29, 2019

Related U.S. Application Data

(60) Provisional application No. 62/635,299, filed on Feb. 26, 2018.

(51) Int. Cl.
*A23K 10/26* (2016.01)
*A22C 17/08* (2006.01)
*A22C 18/00* (2006.01)

(52) U.S. Cl.
CPC ............. *A23K 10/26* (2016.05); *A22C 17/08* (2013.01); *A22C 18/00* (2013.01)

(58) Field of Classification Search
CPC ... C11B 3/00; C11B 3/001; C11B 3/04; C11B 3/06; C11B 3/08; C11B 13/00; A22C 17/08; A22C 17/00; A22C 18/00; A23K 10/26
USPC ........................................................ 426/641
See application file for complete search history.

(56) References Cited

U.S. PATENT DOCUMENTS

| 3,000,742 | A | * | 9/1961 | Kuster | .................. A23K 10/26 426/623 |
| 3,627,542 | A | | 12/1971 | Cohly et al. | |
| 4,087,251 | A | * | 5/1978 | Dobbs | ....................... C11B 1/12 422/309 |
| 9,826,760 | B2 | | 11/2017 | Ding et al. | |
| 9,872,509 | B2 | | 1/2018 | Zitnik | |
| 2018/0116247 | A1 | | 5/2018 | Zitnik | |
| 2019/0261649 | A1 | | 8/2019 | Zitnik | |

OTHER PUBLICATIONS https://www.researchgate.net/publication/257419457_Deliming_with_weak_acids_Effects_on_leather_quality_and_effluent çolak et al Deliming with Weak Acids: Effect on Leather Quality and Effluent May 2008 Journal—Society of Leather Technologists and Chemists 92(3):120-123 (Year: 2008).*
K9 Collagen, The Best Collagen Based Pet Food Supplements Are Here, Jul. 28, 2017, www.k9collagen.com/blogs/news/the-best-collagen-based-pet-food-supplements-are-here.
International Search Report and Written Opinion for PCT/US19/19549 mailed Feb. 25, 2020.

* cited by examiner

*Primary Examiner* — Vera Stulii
(74) *Attorney, Agent, or Firm* — Kirby Drake

(57) ABSTRACT

A pre-rendering system and method includes grinding limed cattle hide fleshings. The ground, limed cattle hide fleshings may then be de-limed using one or more acids or acidic solutions and then may be neutralized using one or more acids. Once the cattle hide fleshings have been de-limed and neutralized, they may be washed and then dried to prepare edible meat, such as for pet food or other animal feed, that may be rendered.

12 Claims, 1 Drawing Sheet

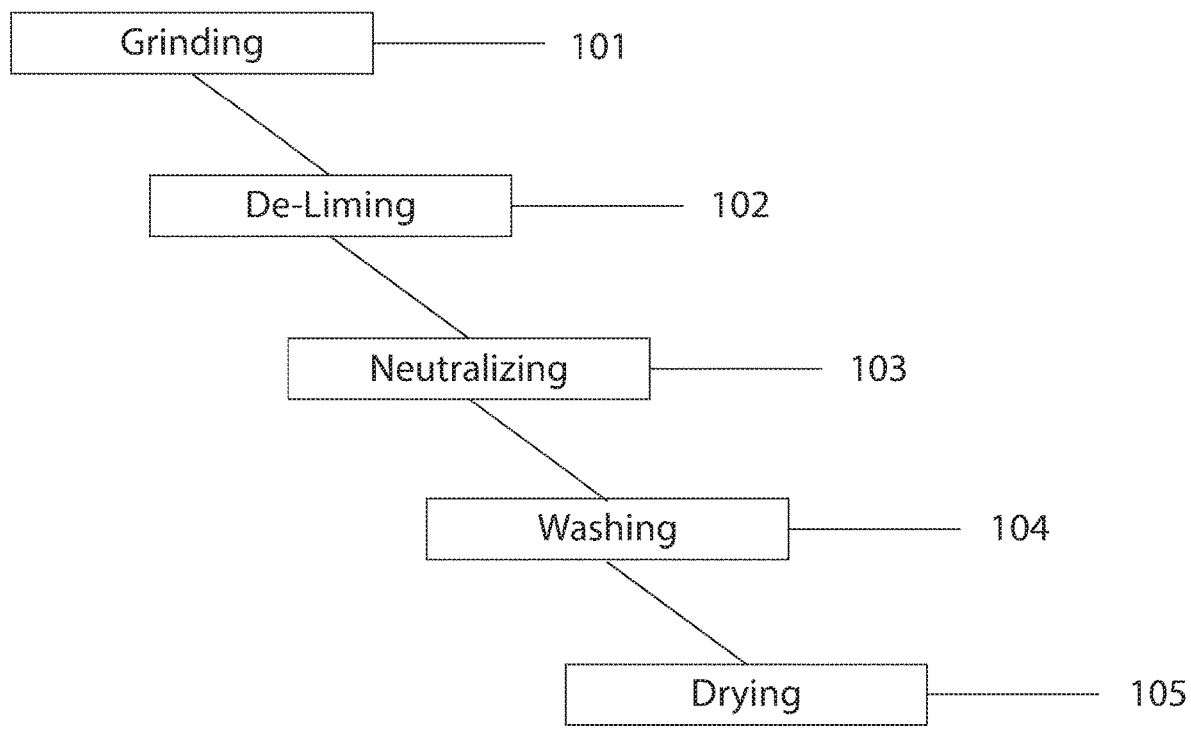

PRE-RENDERING SYSTEM AND METHOD

CROSS-REFERENCE TO RELATED APPLICATION

The present Application claims the benefit of Provisional Application No. 62/635,299 filed Feb. 26, 2018, entitled Pre-Rendering System and Method, which is incorporated by reference in its entirety.

FIELD OF THE DISCLOSURE

The present disclosure generally relates to pre-rendering, and more particularly to a system and method for preparing limed cattle hide fleshings to be converted into edible meat and then rendered.

BACKGROUND

Rendering is a process that generally converts animal products into more useful materials. Rendering typically separates the fat from the bone and protein and yields a fat commodity (such as grease) and a protein meal (meat or bone meal). However, before rendering takes place, the raw material must be placed into a state that it can be converted into edible meat.

SUMMARY

Embodiments of the present disclosure may provide a pre-rendering system and method that may include grinding limed cattle hide fleshings using a grinder. The ground, limed cattle hide fleshings may then be de-limed in a mixer or drum using products such as but not limited to, one or more acids or acidic solutions, including but not limited to, ammonium sulfate, ammonium chloride and/or sodium hexabetaphosphate; however, the one or more acids also or alternatively may include boric acid, acetic acid, formic acid, lactic acid, phosphoric acid, and carbonic acid or other acids that may help reduce the lime present and cause rapid pH adjustment. The de-limed cattle hide fleshings may then be neutralized using one or more acids, including but not limited to, sulfuric acid, boric acid, acetic acid, formic acid, lactic acid, phosphoric acid, and/or carbonic acid. Once the cattle hide fleshings have been de-limed and neutralized, they may be washed and then dried to prepare edible meat, such as for pet food or other animal feed, that may be rendered in embodiments of the present disclosure.

Further embodiments of the present disclosure may provide a method for pre-rendering, the method comprising: grinding limed cattle hide fleshings; de-liming the ground limed cattle hide fleshings using one or more acids to adjust the pH to approximately 8-9; and neutralizing the ground de-limed cattle hide fleshings to adjust the pH to 7 and produce edible meat to render to produce pet food products or other animal feed, wherein the neutralization step may be performed using one more acids selected from the group comprising: sulfuric acid, boric acid, acetic acid, formic acid, lactic acid, phosphoric acid, and carbonic acid. The limed cattle hide fleshings may include fat, animal products and/or whole animals. The de-liming step may take place in one or more mixers or drums. The one or more acids used in the de-liming step may be selected from the group comprising: ammonium sulfate, ammonium chloride, sodium hexabetaphosphate, boric acid, acetic acid, formic acid, lactic acid, phosphoric acid, and carbonic acid. The one or more acids may be applied directly to the ground de-limed cattle hide fleshings in the neutralization step. No heat may be applied in the neutralization step. Further steps may include washing the ground neutralized, de-limed cattle hide fleshings to remove impurities; and drying the washed cattle hide fleshings to eliminate residual water. The drying step may be performed using a decanter. The drying step may be performed using a centrifuge to remove residual liquid and fine materials below approximately 10-20 microns in size.

Additional embodiments of the present disclosure may provide a method for pre-rendering, the method comprising: grinding limed cattle hide fleshings; and de-liming the ground limed cattle hide fleshings using one or more acids to adjust the pH to 7 and produce edible meat to render to produce pet food products or other animal feed, wherein the neutralization step is performed using one more acids selected from the group comprising: ammonium sulfate, ammonium chloride, sodium hexabetaphosphate, sulfuric acid, boric acid, acetic acid, formic acid, lactic acid, phosphoric acid, and carbonic acid. The one or more acids may be applied directly to the ground cattle hide fleshings. No heat may be applied in the de-liming step. The method also may comprise washing the ground de-limed cattle hide fleshings to remove impurities; and drying the washed cattle hide fleshings to eliminate residual water. The grinding step may produce additional surface area by allowing for lower use of energy in the rendering process.

Other embodiments of the present disclosure may provide a method for pre-rendering, the method comprising: grinding limed cattle hide fleshings; de-liming the ground limed cattle hide fleshings using one or more acids to adjust the pH to approximately 8-9, wherein the one or more acids are selected from the group comprising: ammonium sulfate, ammonium chloride, sodium hexabetaphosphate, boric acid, acetic acid, formic acid, lactic acid, phosphoric acid, and carbonic acid; neutralizing the ground de-limed cattle hide fleshings to adjust the pH to 7 and produce edible meat to render to produce pet food products or other animal feed, wherein the neutralization step is performed using one more acids selected from the group comprising: sulfuric acid, boric acid, acetic acid, formic acid, lactic acid, phosphoric acid, and carbonic acid; washing the ground de-limed cattle hide fleshings to remove impurities; and drying the washed cattle hide fleshings to eliminate residual water. The one or more acids may be applied directly to the ground cattle hide fleshings in the neutralization step. No heat may be applied in the neutralization step.

BRIEF DESCRIPTION OF THE DRAWINGS

For a more complete understanding of this disclosure, reference is now made to the following description, taken in conjunction with the accompanying drawing, in which:

The FIGURE depicts a pre-rendering process according to an embodiment of the present disclosure.

DETAILED DESCRIPTION

Embodiments of the present disclosure may provide a system and method for pre-rendering to prepare limed cattle hide fleshings to be converted into edible meat, such for pet food or other animal feed. The limed cattle hide fleshings, including fat, animal products, and/or whole animals, may be broken into pieces using a grinder, such as a Weiler grinder (FIGURE, 101). However, it should be appreciated that other similarly functioning machines may be used to perform this step without departing from the present disclosure. By grinding the cattle hide fleshings in this early step (FIG. 101), additional surface area may be created. This may help in later steps, including in the rendering process, by allowing a much lower use of energy to create the desired effect.

Following the grinding step, the ground cattle hide fleshings may then be placed into one or more mixers or drums to de-lime the cattle hide fleshings (FIGURE, 1020. During the de-liming operation, products including, but not limited to, one or more acids or acidic solutions may be used to get rid of the lime. The one or more acids may include, but are not limited to, ammonium sulfate, ammonium chloride and/or sodium hexabetaphosphate; however, the one or more acids also or alternatively may include boric acid, acetic acid, formic acid, lactic acid, phosphoric acid, and carbonic acid or other acids that may help reduce the lime present and cause rapid pH adjustment. It should be appreciated that if one or more acids are used in de-liming, following de-liming, the pH values may be approximately 8-9.

After the de-liming operation is completed, a neutralization step may be performed wherein one or more acids, such as sulfuric acid, boric acid, acetic acid, formic acid, lactic acid, phosphoric acid, and/or carbonic acid, may be applied to the de-limed, ground cattle hide fleshings to drop the pH down to 7 (FIGURE, 103). It should be appreciated that the acid(s) may be applied directly to the de-limed, ground cattle hide fleshings, and no heat is needed to perform this step. While as described herein, there may be a de-liming operation followed by a neutralization step, it should be appreciated that the neutralization step may be done in conjunction with the de-liming operation in some embodiments of the present disclosure.

After the de-limed, ground cattle hide fleshings have been neutralized to a pH of 7, the cattle hide fleshings may then be washed to remove impurities (FIGURE, 104). The washed material may then be dried to eliminate residual water from the cattle hide fleshings (FIGURE, 105); however, there may be embodiments of the present disclosure wherein some moisture may remain to provide edible and quality pet food or other animal feed. This drying step may be performed using a decanter in embodiments of the present disclosure. The decanter may allow for residual or fine solids to be removed from the cattle hide fleshings prior to commencing with the rendering process. In some embodiments of the present disclosure, residual liquid and possible other extremely fine materials (generally below approximately 10-20 microns in size) also may be removed using a centrifuge or other similar mechanism. While certain mechanisms have been described for drying, it should be appreciated that the drying step may be performed in a variety of ways including, but not limited to, utilizing traditional drying equipment without departing from the present disclosure.

Once the steps of the process according to embodiments of the present disclosure have been performed, it should be appreciated that the resultant product may be edible meat that may be rendered to produce pet food products including, but not limited to, dog food and cat food, or other animal feed. It also should be appreciated that the systems and methods according to embodiments of the present disclosure may be used on any type of animal fat and/or bone without departing from the present disclosure. Further, while certain machines have been described as being used in particular steps, it should be appreciated that other machines may be used in place of or in addition to those described to perform similar functions without departing from the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for pre-rendering, the method comprising:
   grinding limed cattle hide fleshings to produce additional surface area and allow for lower use of energy in pre-rendering and then in rendering;
   de-liming the ground limed cattle hide fleshings using one or more salts to adjust the pH to approximately 8-9, wherein the one or more salts acids used in the de-liming step are selected from the group comprising: ammonium sulfate, ammonium chloride, and sodium hexabetaphosphate;
   following the de-liming step, neutralizing the ground de-limed cattle hide fleshings to adjust the pH to 7 and produce edible meat to render to produce pet food products or other animal feed, wherein the neutralization step is performed using one more acids selected from the group comprising:
   sulfuric acid, boric acid, acetic acid, formic acid, lactic acid, phosphoric acid, and carbonic acid; and
   washing the ground neutralized, de-limed cattle hide fleshings to remove impurities,
   wherein no heat is applied in the de-liming and neutralizing steps.

2. The method of claim 1 wherein limed cattle hide fleshings include fat, animal products and/or whole animals.

3. The method of claim 1, wherein the de-liming step takes place in one or more mixers or drums.

4. The method of claim 1, wherein the one or more acids are applied directly to the ground de-limed cattle hide fleshings in the neutralization step.

5. The method of claim 1 further comprising:
   drying the washed cattle hide fleshings to eliminate residual water.

6. The method of claim 5, wherein the drying step is performed using a decanter.

7. The method of claim 5 wherein the drying step is performed using a centrifuge to remove residual liquid and fine materials below approximately 10-20 microns in size.

8. A method for pre-rendering, the method comprising:
   grinding limed cattle hide fleshings to produce additional surface area and allow for lower use of energy in rendering;
   de-liming the ground limed cattle hide fleshings using one or more salts acids selected from the group comprising: ammonium sulfate, ammonium chloride and/or sodium hexabetaphosphate;
   following the de-liming step, neutralizing the ground de-limed cattle hide fleshings to adjust the pH to 7 and produce edible meat to render to produce pet food products or other animal feed, wherein the neutralization step is performed using one more acids selected from the group comprising:

sulfuric acid, boric acid, acetic acid, formic acid, lactic acid, phosphoric acid, and carbonic acid; and washing the ground neutralized, de-limed cattle hide fleshings to remove impurities, wherein no heat is applied in the de-liming and neutralizing steps.

9. The method of claim 8, wherein the one or more acids are applied directly to the ground cattle hide fleshings in the neutralization step.

10. The method of claim 8 further comprising:

drying the washed cattle hide fleshings to eliminate residual water.

11. A method for pre-rendering, the method comprising:

grinding limed cattle hide fleshings to produce additional surface area and allow for lower use of energy in rendering;

de-liming the ground limed cattle hide fleshings using one or more salts to adjust the pH to approximately 8-9, wherein the one or more salts are selected from the group comprising:

ammonium sulfate, ammonium chloride, and sodium hexabetaphosphate;

following the de-liming step, neutralizing the ground de-limed cattle hide fleshings to adjust the pH to 7 and produce edible meat to render to produce pet food products or other animal feed, wherein the neutralization step is performed using one more acids selected from the group comprising:

sulfuric acid, boric acid, acetic acid, formic acid, lactic acid, phosphoric acid, and carbonic acid;

washing the ground de-limed cattle hide fleshings to remove impurities; and using a decanter, drying the washed cattle hide fleshings to eliminate residual water, wherein no heat is applied in the de-liming and neutralizing steps.

12. The method of claim 11, wherein the one or more acids are applied directly to the ground cattle hide fleshings in the neutralization step.

* * * * *